United States Patent
McKie et al.

(10) Patent No.: US 10,823,447 B2
(45) Date of Patent: Nov. 3, 2020

(54) SYSTEM AND METHOD FOR CONTROLLING A BLOWER OF AN ENERGY RECOVERY VENTILATOR IN RESPONSE TO INTERNAL AIR PRESSURE

(71) Applicant: Lennox Industries Inc., Richardson, TX (US)

(72) Inventors: Justin McKie, Frisco, TX (US); Eric Perez, Hickory Creek, TX (US); Steve Schneider, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 658 days.

(21) Appl. No.: 15/465,229

(22) Filed: Mar. 21, 2017

(65) Prior Publication Data
US 2017/0191691 A1    Jul. 6, 2017

Related U.S. Application Data (60) Continuation of application No. 14/929,942, filed on Nov. 2, 2015, now Pat. No. 9,605,861, which is a
(Continued)

(51) Int. Cl.
*F24F 11/00* (2018.01)
*F24F 12/00* (2006.01)
(Continued)

(52) U.S. Cl.
CPC .............. *F24F 11/77* (2018.01); *B23P 19/00* (2013.01); *F24F 11/0001* (2013.01);
(Continued)

(58) Field of Classification Search
CPC .......... F24F 11/77; F24F 12/001; B23P 19/00
See application file for complete search history.

(56) References Cited

U.S. PATENT DOCUMENTS

| 1,094,309 | A | 4/1914 | Daw |
| 3,252,508 | A | 5/1966 | Goettl |

(Continued)

FOREIGN PATENT DOCUMENTS

| CN | 101072491 A | 11/2007 |
| CN | 101236001 A | 8/2008 |

(Continued)

OTHER PUBLICATIONS

"2005 Standard for Performance Rating of Air-to-Air Exchangers for Energy Recovery Ventilation," ANSI/AHRI Standard 1060 (formerly ARI Standard 1060), AHRI Air-Conditioning, Heating, and Refrigeration Institute, 2005, 12 pgs.
(Continued)

*Primary Examiner* — Edelmira Bosques
*Assistant Examiner* — Phillip Decker
(74) *Attorney, Agent, or Firm* — Baker Botts L.L.P.

(57) ABSTRACT

An energy recovery ventilator includes first and second blowers, a pressure transducer and a controller. The first blower is configured to direct a first air stream into a first zone of an enclosure. A second blower configured to direct a second air stream into a second zone of the enclosure. A pressure transducer is configured to determine internal air pressure within the enclosure. A controller is configured to control the first blower and/or the second blower in response to the internal air pressure.

A method includes fabricating a rooftop unit and an ERV housing, the rooftop unit comprising an economizer, the ERV housing comprising first and second blowers and a pressure transducer. The method further includes coupling the ERV housing to the economizer and coupling a controller to the pressure transducer, the controller configured to control the first and/or second blowers in response to the internal air pressure.

13 Claims, 3 Drawing Sheets

Related U.S. Application Data division of application No. 13/267,492, filed on Oct. 6, 2011, now Pat. No. 9,175,872.

(51) Int. Cl.
*F24F 11/77* (2018.01)
*B23P 19/00* (2006.01)
*F24F 110/40* (2018.01)

(52) U.S. Cl.
CPC ..... *F24F 12/001* (2013.01); *F24F 2011/0002* (2013.01); *F24F 2110/40* (2018.01); *F24F 2203/10* (2013.01); *Y02B 30/563* (2013.01); *Y02B 30/746* (2013.01)

(56) References Cited

U.S. PATENT DOCUMENTS

| | | | |
|---|---|---|---|
| 3,889,742 A | 6/1975 | Rush et al. | |
| 4,018,266 A | 4/1977 | Kay | |
| 4,060,913 A | 12/1977 | Yoshida et al. | |
| 4,228,849 A | 10/1980 | Heinola | |
| 4,257,318 A * | 3/1981 | Johannsen | G05D 16/2073 454/229 |
| 4,281,522 A | 8/1981 | Bussjager | |
| 4,342,359 A | 8/1982 | Baker | |
| 4,392,417 A * | 7/1983 | Johannsen | G05D 16/2073 454/229 |
| 4,497,361 A | 2/1985 | Hajicek | |
| 4,611,653 A | 9/1986 | Ikemura et al. | |
| 4,627,245 A | 12/1986 | Levine | |
| 4,698,981 A * | 10/1987 | Kaneko | F25B 13/00 62/180 |
| 4,727,931 A | 3/1988 | Berner | |
| 4,754,651 A | 7/1988 | Shortridge et al. | |
| 4,784,212 A | 11/1988 | Brimer et al. | |
| 4,825,936 A | 5/1989 | Hoagland et al. | |
| 4,834,004 A | 5/1989 | Butuk et al. | |
| 4,841,733 A | 6/1989 | Dussault et al. | |
| 4,843,838 A | 7/1989 | Trask | |
| 4,854,726 A | 8/1989 | Lesley et al. | |
| 4,873,649 A | 10/1989 | Grald et al. | |
| 5,062,280 A | 11/1991 | Martin, Sr. | |
| 5,065,593 A | 11/1991 | Dudley et al. | |
| 5,069,272 A | 12/1991 | Chagnot | |
| 5,173,922 A | 12/1992 | Arakawa et al. | |
| 5,183,098 A | 2/1993 | Chagnot | |
| 5,228,306 A | 7/1993 | Shyu et al. | |
| 5,238,052 A | 8/1993 | Chagnot | |
| 5,269,660 A * | 12/1993 | Pradelle | E21F 1/00 417/18 |
| 5,276,630 A | 1/1994 | Baldwin et al. | |
| 5,316,073 A | 5/1994 | Klaus et al. | |
| 5,372,182 A | 12/1994 | Gore | |
| 5,376,045 A | 12/1994 | Kiser | |
| 5,423,187 A | 6/1995 | Fournier | |
| 5,439,415 A * | 8/1995 | Hirikawa | B60H 1/00828 454/105 |
| 5,482,108 A | 1/1996 | Essle et al. | |
| 5,497,823 A | 3/1996 | Davis | |
| 5,515,909 A | 5/1996 | Tanaka | |
| 5,564,626 A | 10/1996 | Kettler et al. | |
| 5,726,424 A | 3/1998 | Koether | |
| 5,728,289 A | 3/1998 | Kirchnavy et al. | |
| 5,761,908 A | 6/1998 | Oas et al. | |
| 5,826,641 A | 10/1998 | Bierwirth et al. | |
| 5,839,096 A | 11/1998 | Lyons et al. | |
| 5,911,747 A | 6/1999 | Gauthier | |
| 5,927,096 A | 7/1999 | Piccione | |
| 6,009,763 A | 1/2000 | Berckmans et al. | |
| 6,039,109 A | 3/2000 | Chagnot et al. | |
| 6,067,808 A | 5/2000 | Dage | |
| 6,079,627 A | 6/2000 | Kettler | |
| 6,089,464 A | 7/2000 | Morgan | |
| 6,209,330 B1 | 4/2001 | Timmerman et al. | |
| 6,209,622 B1 | 4/2001 | Lagace et al. | |
| 6,223,544 B1 | 5/2001 | Seem | |
| 6,227,961 B1 * | 5/2001 | Moore | F04D 27/004 454/229 |
| 6,289,974 B1 | 9/2001 | DeGregoria et al. | |
| 6,319,114 B1 | 11/2001 | Nair et al. | |
| 6,328,095 B1 | 12/2001 | Felber et al. | |
| 6,355,091 B1 | 3/2002 | Felber et al. | |
| 6,415,616 B1 | 7/2002 | Kim | |
| 6,415,617 B1 * | 7/2002 | Seem | F24F 3/044 62/186 |
| 6,434,957 B1 | 8/2002 | Nishizuka et al. | |
| 6,438,971 B1 | 8/2002 | Lentz et al. | |
| 6,557,365 B2 | 5/2003 | Dinnage et al. | |
| 6,575,228 B1 | 6/2003 | Ragland et al. | |
| 6,672,627 B1 | 1/2004 | Mariman et al. | |
| 6,776,708 B1 | 8/2004 | Daoutis et al. | |
| 6,789,618 B2 | 9/2004 | Pearson | |
| 6,849,234 B2 | 2/2005 | Lentz et al. | |
| 6,880,619 B1 | 4/2005 | Suzukawa et al. | |
| 6,881,142 B1 | 4/2005 | Nair | |
| 6,889,750 B2 | 5/2005 | Lagace et al. | |
| 6,925,999 B2 | 8/2005 | Hugghins et al. | |
| 6,929,057 B1 | 8/2005 | Sahota et al. | |
| 6,981,385 B2 | 1/2006 | Arshansky et al. | |
| 6,986,386 B2 | 1/2006 | Sekhar et al. | |
| 6,986,469 B2 | 1/2006 | Gauthier et al. | |
| 6,996,999 B2 | 2/2006 | Wacker | |
| 7,001,263 B2 | 2/2006 | Shaben | |
| 7,009,528 B2 | 3/2006 | Griep | |
| 7,012,516 B2 | 3/2006 | Laurosch et al. | |
| 7,053,497 B2 | 5/2006 | Sodemann et al. | |
| 7,073,566 B2 | 7/2006 | Lagace et al. | |
| 7,090,000 B2 | 8/2006 | Taylor | |
| 7,100,634 B2 | 9/2006 | Robb et al. | |
| 7,231,967 B2 | 6/2007 | Haglid | |
| 7,258,280 B2 | 8/2007 | Wolfson | |
| 7,275,533 B2 | 10/2007 | Soeholm | |
| 7,308,384 B2 | 12/2007 | Shah et al. | |
| 7,316,261 B2 | 1/2008 | Cho et al. | |
| 7,434,413 B2 | 10/2008 | Wruck | |
| 7,440,864 B2 | 10/2008 | Otto | |
| 7,441,586 B2 | 10/2008 | Chung et al. | |
| 7,458,228 B2 | 12/2008 | Lagace et al. | |
| 7,625,277 B2 * | 12/2009 | Palmer | A61L 9/20 454/255 |
| 7,716,936 B2 | 5/2010 | Bailey et al. | |
| 7,758,407 B2 | 7/2010 | Ahmed | |
| 7,765,826 B2 | 8/2010 | Nichols | |
| 7,841,381 B2 | 11/2010 | Chagnot et al. | |
| 7,856,289 B2 | 12/2010 | Schanin et al. | |
| 7,886,986 B2 | 2/2011 | Fischer, Jr. et al. | |
| 7,891,573 B2 | 2/2011 | Finkam et al. | |
| 7,922,149 B2 | 4/2011 | Anderson et al. | |
| 7,941,294 B2 | 5/2011 | Shahi et al. | |
| 7,992,794 B2 | 8/2011 | Leen et al. | |
| 8,029,608 B1 | 10/2011 | Breslin | |
| 8,046,196 B2 | 10/2011 | Felcman et al. | |
| 8,112,181 B2 | 2/2012 | Remsburg | |
| 8,118,236 B2 | 2/2012 | Lestage et al. | |
| 8,123,518 B2 | 2/2012 | Nordberg et al. | |
| 8,199,005 B2 | 6/2012 | Thomas et al. | |
| 8,224,489 B2 | 7/2012 | Federspiel | |
| 8,262,992 B2 | 9/2012 | Kontschieder et al. | |
| 8,267,164 B2 | 9/2012 | Lestage et al. | |
| 8,295,981 B2 | 10/2012 | Hadzidedic | |
| 8,352,080 B2 | 1/2013 | Grohman et al. | |
| 8,352,081 B2 | 1/2013 | Grohman | |
| 8,387,272 B2 | 3/2013 | Kim et al. | |
| 8,397,527 B2 | 3/2013 | Miller | |
| 8,433,446 B2 | 4/2013 | Grohman et al. | |
| 8,437,877 B2 | 5/2013 | Grohman et al. | |
| 8,437,878 B2 | 5/2013 | Grohman et al. | |
| 8,463,442 B2 | 6/2013 | Curry et al. | |
| 8,463,443 B2 | 6/2013 | Grohman et al. | |
| 8,500,402 B2 | 8/2013 | Wobben | |
| 8,539,786 B2 | 9/2013 | McSweeney | |
| 8,548,630 B2 | 10/2013 | Grohman | |
| 8,550,368 B2 | 10/2013 | Butler et al. | |

(56) References Cited

U.S. PATENT DOCUMENTS

| | | |
|---|---|---|
| 8,584,305 B2 | 11/2013 | Won et al. |
| 8,600,558 B2 | 12/2013 | Grohman |
| 8,655,491 B2 | 2/2014 | Hadzidedic et al. |
| 8,672,733 B2 | 3/2014 | Chen et al. |
| 8,702,482 B2 | 4/2014 | Helt et al. |
| 8,720,532 B2 | 5/2014 | Malone et al. |
| 8,725,298 B2 | 5/2014 | Wallaert |
| 8,725,299 B2 | 5/2014 | Hess et al. |
| 8,900,041 B2 | 12/2014 | Toy |
| 8,994,539 B2 | 3/2015 | Grohman et al. |
| 9,020,647 B2 | 4/2015 | Johnson et al. |
| 9,175,872 B2 | 11/2015 | McKie et al. |
| 9,188,356 B2 | 11/2015 | Murayama et al. |
| 9,222,695 B2 | 12/2015 | Hasegawa et al. |
| 9,377,768 B2 | 6/2016 | Grohman |
| 9,395,097 B2 | 7/2016 | McKie et al. |
| 9,404,668 B2 | 8/2016 | McKie et al. |
| 9,441,843 B2 | 9/2016 | McKie et al. |
| 9,534,797 B2* | 1/2017 | Tsutsumi ............... F24F 11/77 |
| 9,605,861 B2 | 3/2017 | McKie et al. |
| 9,671,122 B2 | 6/2017 | McKie et al. |
| 9,702,578 B2 | 7/2017 | Yonezawa et al. |
| 2002/0153133 A1 | 10/2002 | Haglid |
| 2003/0178411 A1 | 9/2003 | Manganiello et al. |
| 2005/0039481 A1 | 2/2005 | Chant |
| 2005/0052845 A1* | 3/2005 | Breier ............... H05K 5/0213 361/690 |
| 2005/0236150 A1 | 10/2005 | Chagnot et al. |
| 2005/0252229 A1 | 11/2005 | Moratalla |
| 2006/0117769 A1* | 6/2006 | Helt ............... F24F 11/0001 62/161 |
| 2006/0130497 A1 | 6/2006 | Kang et al. |
| 2007/0022770 A1 | 2/2007 | Liu |
| 2007/0045439 A1 | 3/2007 | Wolfson |
| 2007/0045601 A1 | 3/2007 | Rhee |
| 2007/0084938 A1 | 4/2007 | Liu |
| 2007/0144187 A1 | 6/2007 | Lee |
| 2007/0171647 A1 | 7/2007 | Artwohl et al. |
| 2007/0197159 A1* | 8/2007 | Byczynski ............ F24F 11/0001 454/340 |
| 2007/0205297 A1* | 9/2007 | Finkam ............... F24F 11/74 236/1 C |
| 2007/0209653 A1 | 9/2007 | Beisheim |
| 2007/0227168 A1 | 10/2007 | Simmons |
| 2007/0234748 A1 | 10/2007 | Alvord et al. |
| 2007/0251251 A1 | 11/2007 | Wojdyla et al. |
| 2007/0257121 A1 | 11/2007 | Chapman et al. |
| 2008/0033599 A1 | 2/2008 | Aminpour et al. |
| 2008/0139105 A1* | 6/2008 | Kuentz ............... F24F 11/77 454/238 |
| 2008/0144238 A1 | 6/2008 | Cline et al. |
| 2008/0307803 A1* | 12/2008 | Herzon ............... F24F 3/147 62/93 |
| 2009/0095096 A1 | 4/2009 | Dean et al. |
| 2009/0120111 A1 | 5/2009 | Taras et al. |
| 2009/0165644 A1 | 7/2009 | Campbell |
| 2009/0215375 A1 | 8/2009 | Hagensen |
| 2010/0070088 A1 | 3/2010 | Josserand et al. |
| 2010/0076606 A1* | 3/2010 | Gatley ............... F04D 27/004 700/276 |
| 2010/0106310 A1 | 4/2010 | Grohman |
| 2010/0106312 A1 | 4/2010 | Grohman et al. |
| 2010/0242507 A1 | 9/2010 | Meckler |
| 2011/0097988 A1 | 4/2011 | Lord |
| 2011/0146941 A1* | 6/2011 | Benoit ............... F28D 9/0062 165/11.1 |
| 2012/0006038 A1 | 1/2012 | Sharma et al. |
| 2012/0052791 A1 | 3/2012 | Kurelowech |
| 2012/0131933 A1* | 5/2012 | Kim ............... F24F 3/0442 62/89 |
| 2013/0090769 A1 | 4/2013 | McKie et al. |
| 2013/0092346 A1 | 4/2013 | McKie et al. |
| 2013/0095744 A1 | 4/2013 | McKie et al. |
| 2013/0118188 A1 | 5/2013 | McKie et al. |

FOREIGN PATENT DOCUMENTS

| | | |
|---|---|---|
| CN | 201199080 Y | 2/2009 |
| CN | 102466304 A | 5/2012 |
| JP | H05-180501 A | 7/1993 |
| JP | H08-82432 A | 3/1996 |
| JP | H09-60924 A | 3/1997 |
| JP | 2000-264054 A | 9/2000 |
| JP | 2001-082763 A | 3/2001 |
| JP | 2001-317795 A | 11/2001 |
| JP | 2002-048380 A | 2/2002 |
| JP | 2002-168479 A | 6/2002 |
| JP | 2002-357356 A | 12/2002 |
| JP | 2003-148780 A | 5/2003 |
| JP | 2005-133979 A | 5/2005 |
| JP | 2005-257221 A | 9/2005 |
| JP | 2010-261696 A | 11/2010 |
| JP | 2011-047581 A | 3/2011 |
| WO | WO-2010131336 A1 * | 11/2010 ............ F24F 11/77 |

OTHER PUBLICATIONS

"Indoor Air Quality ERV Energy Recovery Ventilator 60 HZ," Lennox Engineering Data, Bulletin No. 210245, Mar. 2010, 20 pgs.

* cited by examiner

SYSTEM AND METHOD FOR CONTROLLING A BLOWER OF AN ENERGY RECOVERY VENTILATOR IN RESPONSE TO INTERNAL AIR PRESSURE

CROSS REFERENCE TO RELATED INFORMATION

This application is a continuation application of U.S. patent application Ser. No. 14/929,942, now U.S. Pat. No. 9,605,861, filed Nov. 2, 2015, titled "ERV Global Pressure Demand Control Ventilation Mode", which is a divisional of Ser. No. 13/267,492, now U.S. Pat. No. 9,175,872, filed Oct. 6, 2011, which is related to U.S. patent application Ser. No. 13/267,542 to Justin McKie et al. and Ser. No. 13/267,441 to Justin McKie et al. both filed on even date therewith, and both commonly assigned with that application, the contents of which are hereby incorporated by reference herein in their entirety.

TECHNICAL FIELD

This application is directed, in general, to climate control systems, and, more specifically, to methods and systems for improving operating efficiency of such system.

BACKGROUND OF THE INVENTION

Some HVAC units are located on the rooftop of a commercial building. These so-called rooftop units, or RTUs, typically include one or more blowers and heat exchangers to heat and/or cool the building, and baffles to control the flow of air within the RTU.

One aspect of airflow control is the venting of stale air within the building and the intake of fresh air from the outside to maintain air quality within the building. This exchange of air is a significant potential source of energy loss, as fresh air may need to be cooled or heated to maintain the temperature set point in the building, and previously cooled or heated air is lost to the environment.

The loss of energy that results from air exchange is a source of potential savings in the continuing effort to improve efficiency of commercial HVAC systems.

BRIEF SUMMARY OF THE INVENTION

One embodiment provides an energy recovery ventilator that includes first and second blowers, a pressure transducer and a controller. The first blower is configured to direct a first air stream into a first zone of an enclosure. A second blower is configured to direct a second air stream into a second zone of the enclosure. A pressure transducer is configured to determine internal air pressure within the enclosure. A controller is configured to control the first blower and/or the second blower in response to the internal air pressure.

Another embodiment provides a method, e.g. for manufacturing an HVAC energy recovery ventilator. The method includes configuring first and second blowers, a pressure transducer, and a controller. The first blower is configured to direct a first airstream into an enclosure. The second blower is configured to direct a second airstream from said enclosure. The pressure transducer is configured to determine an internal air pressure within said enclosure. The controller is configured to control one or both of said first and second blowers in response to said internal air pressure.

Yet another embodiment provides an HVAC energy recovery ventilator controller. The controller includes a processor, input and output interfaces and a memory bearing processor instructions. The input interface is configured to receive and convert a pressure signal from a pressure transducer to a form readable by said processor. The output interface is configured to convert a blower control signal from said processor to a form suitable to control a blower. The memory is configured to direct said processor to control said blower in response to said pressure signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Many commercial buildings provide heating and cooling with a roof-top heating, ventilating and air conditioning (HVAC) unit, or RTU. Some such systems include an air-side economizer, or briefly, an economizer. The economizer provides the ability to selectively provide fresh outside air to the RTU or to recirculate exhaust air from the building back through the RTU to be cooled or heated again.

The HVAC system typically recirculates a portion of the exhaust air as it heats or cools the air. When the enthalpy of the fresh air is less than the enthalpy of the recirculated air, conditioning the fresh air may be more energy-efficient than conditioning the recirculated air. In this case the economizer may exhaust a portion of the stale air and replace the vented air with outside air. When the outside air is both sufficiently cool and sufficiently dry it may be possible that no additional conditioning of the outside air is needed. In this case the economizer may draw a sufficient quantity of outside air into the building to provide all the needed cooling.

In some installations an energy recovery ventilator (ERV) may be used to pre-condition the fresh air demanded by the RTU. The ERV may include, e.g. an enthalpy wheel to transfer heat and/or humidity between an incoming fresh air stream and an outgoing exhaust air stream.

In some cases difficulties may arise when balancing the fresh air required by the economizer and the fresh air provided by the ERV. A conventional approach to such balancing might utilize some form of communication between the ERV and the economizer. However, there are several reasons why such an approach may be undesirable. First, such communication typically involves additional cost related to additional interfacing components, such as cables and wiring blocks. Second, some standardization might be needed to allow for various models of the ERV to interface to various models of the RTU. Such standardization involves additional infrastructure complexity, such as interface standards. Third, such an interface represents a potential source of failure in the HVAC system, likely requiring inspection and maintenance.

To avoid such deficiencies of such conventional approaches, the inventors have discovered an innovative solution that allows the ERV to operate cooperatively with the economizer RTU, while remaining electrically autonomous of the RTU, by monitoring the pressure within the ERV. This scheme is sometimes referred to herein as Global Pressure Demand Control (GPDC) ventilation mode. In various embodiments described below, when the ERV operates in GPDC mode, the air flow within the ERV is controlled to maintain the pressure within the ERV at about the same level as the outside air, or atmospheric, pressure. When operated in this manner the ERV becomes essentially invisible to the economizer, and the fresh air requirements of the economizer are met without electrical communication between the ERV and the economizer. No interface between the ERV and the economizer is needed, thus obviating the need for hardware and interface standards to implement the interface.

Figure 1:
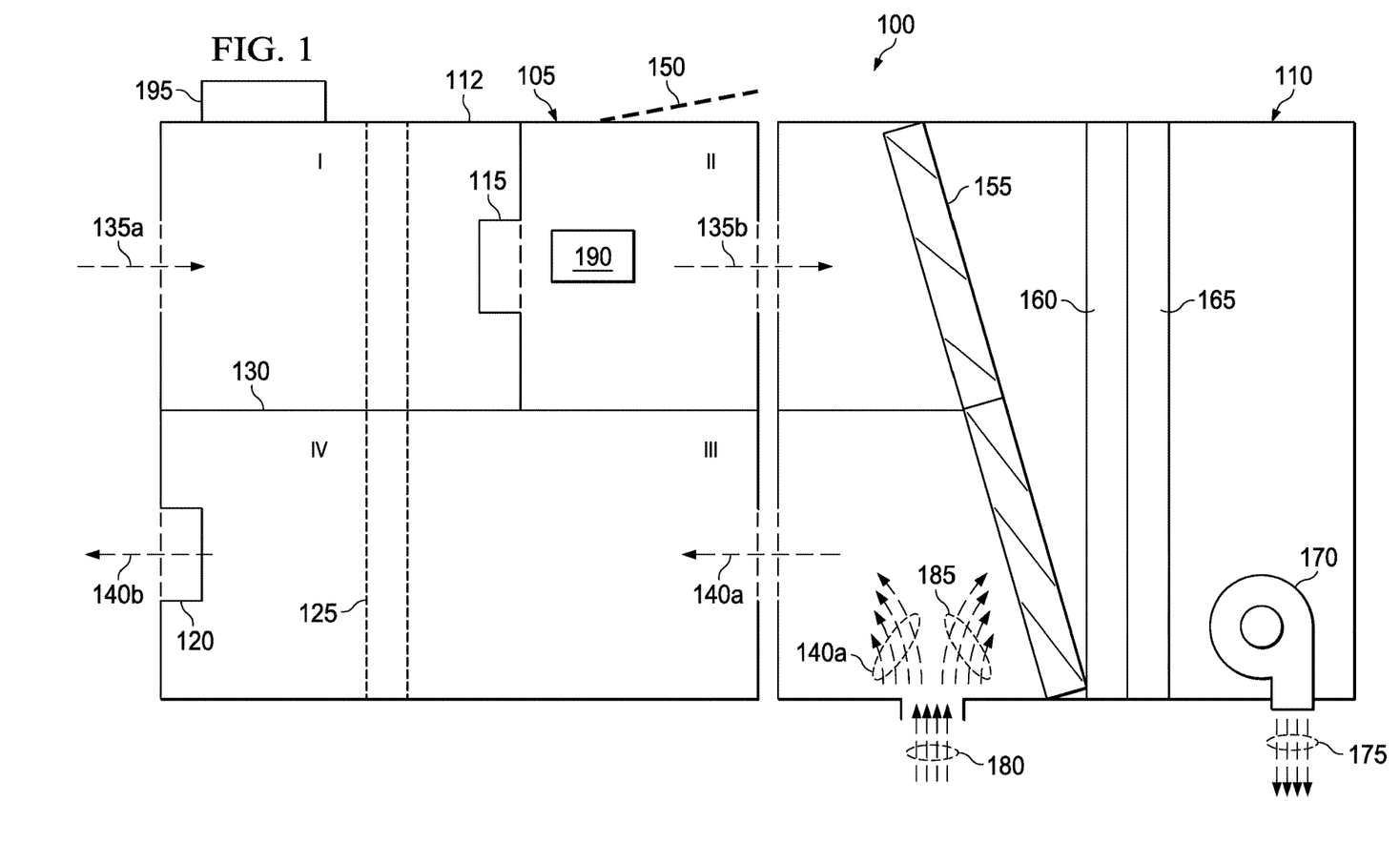
FIG. 1 illustrates an HVAC system according to one embodiment, including a roof-top unit and an energy recovery ventilator (ERV) configured to maintain an internal pressure set point.

Turning to FIG. 1, illustrated is an HVAC system 100 according to one embodiment. The system 100 includes an ERV 105 and an RTU 110. While the embodiment of the system 100 is discussed in the context of a roof-top unit, the scope of the disclosure includes other HVAC applications that are not roof-top mounted.

The ERV 105 includes an enclosure (e.g. a cabinet) 112, first and second variable speed blowers 115 and 120, an enthalpy wheel 125 and a divider 130. The blowers 115, 120 may be of any conventional or novel type, such as radial or axial, impeller- or propeller-types. The blowers 115 and 120 as illustrated are configured in a pull-pull configuration, but embodiments of the system 100 are not limited thereto. The enthalpy wheel 125 may also be conventional or novel. Without limitation to any particular type of enthalpy wheel, those skilled in the pertinent art will appreciate that enthalpy wheels typically include a heat and/or moisture transfer medium that provides a semi-permeable barrier to airflow therethrough.

In the illustrated embodiment the enthalpy wheel 125 and the divider 130 divide the ERV 105 into four zones, I, II, III and IV. The blower 115 operates to draw an airstream 135a from outside the enclosure 112 into zone I. The incoming air may be, e.g. outside air. As used herein outside air is air that is initially external to the ERV 105 and an enclosed space (such as a building) that is environmentally conditioned by the system 100. The air stream 135a passes through the enthalpy wheel 125 and enters zone II. Air within zone II may exit the ERV 105 via an unreferenced outlet as an airstream 135b.

The ERV 105 receives an air stream 140a from the RTU 110 into zone III. The blower 120 draws the airstream 140a through the enthalpy wheel 125 to zone IV. The air exits zone IV via an unreferenced outlet.

In some embodiments the airstreams 135a,b and 140a,b all have about an equal flow rate, e.g. m3/minute. In some other embodiments the ERV 105 includes one or more bypass dampers 150 that provide a controllable path between one or more of the zones and the outside air. In such cases the air streams 135a,b and 140a,b may have different flow rates to reflect air that is drawn into or vented via the one or more dampers 150. In the following description it is assumed without limitation for the purpose of discussion that any such dampers are closed so that the airstreams 135a,b and 140a,b are about equal.

In the illustrated embodiment the ERV 105 is joined to the RTU 110 such that the ERV 105 provides the air stream 135b to an unreferenced intake of the RTU 110. The ERV 105 also receives the air stream 140a from the RTU 110 via an unreferenced exhaust outlet of the RTU 110.

The RTU 110 includes an economizer 155, a cooling element 160, a heating element 165 and a blower 170. The blower operates to force an air stream 175 into the building being conditioned via an unreferenced supply duct. A return airstream 180 from the building enters the RTU 110 at an unreferenced return duct.

A first portion 185 of the air stream 180 recirculates through the economizer 155 and joins the air stream 135b to provide supply air to the building. A second portion of the air stream 180 is the air stream 140a, which enters zone III of the ERV 105.

The economizer 155 may operate conventionally to vent a portion of the return air 180 and replace the vented portion with the air stream 135b. Thus air quality characteristics such as $CO_2$ concentration and humidity may be maintained within defined limits within the building being conditioned.

If the airflow required to meet the demand of the economizer 155 increases without a commensurate increase of the speed of the blower 115, the pressure within zone II will decrease. A pressure transducer 190 creates an electrical signal related to the pressure within zone II and sends the signal to a controller 195. The controller 195 then increases the speed of the blower 115 to increase the pressure within zone II. The controller may also increase the speed of the blower 120 to increase the flow of the air stream 140a. Thus the fresh air supply demanded by the economizer 155 may be met without electrical communication between the RTU 110 and the ERV 105.

Analogously, the economizer in some cases may reduce its demand for fresh air, recirculating a greater portion of the air stream 180 to the conditioned building. In this case the pressure in zone II is expected to increase without a commensurate reduction of the blower 115 speed. The controller 195 can then reduce the speed of the blower 115 to allow the pressure in zone II to decrease. The controller 195 may also control the speed of the blower 120 to match the flow of the air streams 135b and 140a. Thus, the fresh air requirement of the economizer 155 may be met.

In some embodiments the fans 115, 120 may be configured in a push-push configuration. In such embodiments, the fan 115 may be located at the fresh air inlet to zone I of the ERV 105. The fan 120 may be located at the inlet to zone III. As previously described, when the fresh air demand by the economizer 155 increases the pressure in zone II is expected to drop without an increase in fan speed, and when the fresh air demand decreases the pressure in zone II is expected to increase. Thus the pressure transducer 190 may be located in zone II in such embodiments to communicate the pressure within zone II to the controller 195. The controller 195 may control the fans 115, 120 as previously described to maintain the pressure within the zone II at about zero.

Figure 2:
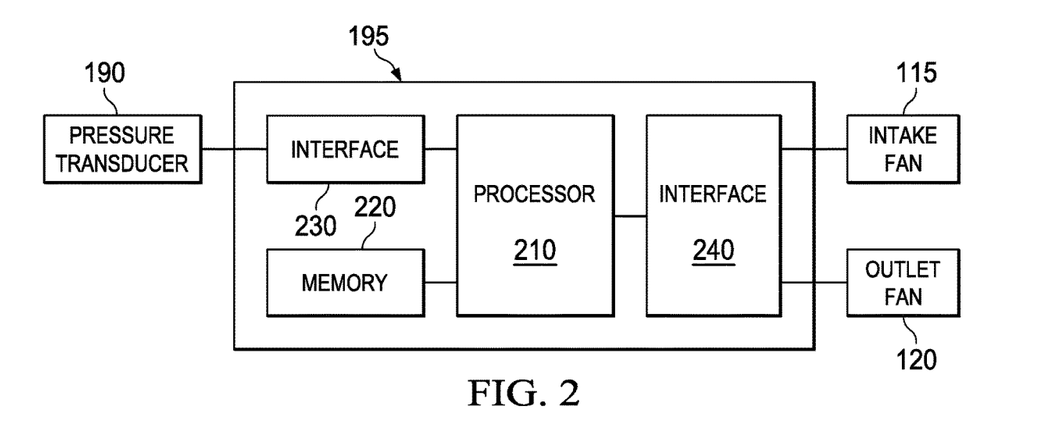
FIG. 2 illustrates an ERV controller configured to control one or more ERV blowers to maintain an ERV internal pressure set point.

FIG. 2 illustrates aspects of the controller 195 and its relationship to the pressure transducer 190 and the blowers 115, 120. The controller 195 includes a processor 210, a memory 220, an input interface 230 and an output interface 240. The processor 210 may be any type of processor or state machine suited to electronic control systems. The processor 210 may be analog or digital, and is described without limitation as a digital controller. In an illustrative example, without limitation thereto, the processor 210 is a commercially available microcontroller.

The memory 220 stores operating instructions for the processor 210. The operating instructions include instructions to implement the control functions that operate the system 100 according to various embodiments described herein. The memory may also include various instructions related to general operation of the system 100 unrelated to the ERV 105. The memory 220 may include one or more electronic components distinct from the processor 210, or may be partially or wholly embedded within the processor 210.

The input interface 230 is configured to convert an electrical output from the pressure transducer 190 to a form that is readable by the processor 210. The interface 230 may include any type of conversion devices, such as without limitation an analog-to-digital converter (ADC), current to voltage converter, voltage to current converter, or amplifier. In some embodiments the interface 230 is partially or wholly embedded within the processor 210.

The output interface 240 is configured to convert an electrical output from the controller 210 to a form that the blowers 115 and 120 are configured to recognize as control signals. For example, the output interface 240 may produce a DC voltage proportional to a desired blower speed. The interface 240 may include any type of conversion devices, such as without limitation a digital-to-analog converter (DAC), current to voltage converter, voltage to current converter, or amplifier. In some embodiments the interface 240 is partially or wholly embedded within the processor 210.

In various embodiments the pressure transducer 190 reports an absolute pressure of the zone within which it is located. The controller 195 may be configured to control the fans 115, 120 to maintain an absolute pressure set point that is stored in the memory 220 or otherwise communicated to the controller 195. In other embodiments the controller determines a differential pressure $\Delta P$ between the pressure reported by the pressure transducer 190 and the outside air. The outside air pressure value may be stored as a static value or may optionally be determined by a second pressure transducer (not shown). Various aspects of this discussion may refer to the controller 195 operating to maintain $\Delta P$ at about zero. However, the scope of the disclosure explicitly includes embodiments in which the controller operates to maintain a particular non-zero pressure set point.

Figure 3:
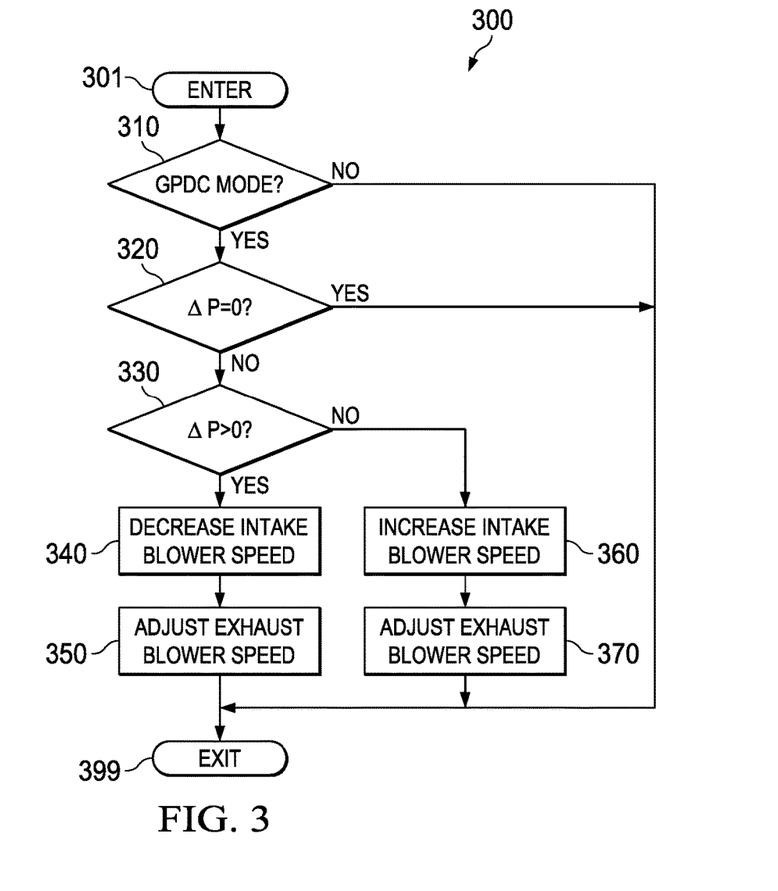
FIG. 3 is an operation flow chart for one embodiment of the ERV controller of FIG. 2.

FIG. 3 illustrates one embodiment of a method 300 for controlling the operation of the system 100. The method 300 may be implemented in instructions stored by the memory 220. In various embodiments, including that illustrated by FIG. 3, the method 300 is a subroutine of a more general control algorithm configured to operate the system 100, an in particular the ERV 105. The method 300 is described without limitation with reference to the controller 195, and more specifically to the processor 210. The method 300 is also described without limitation for the case that the ERV 105 is configured in a pull-pull configuration. Those skilled in the pertinent art may modify the method 300 for the push-push configuration.

The method 300 begins with an entry point 301 from a calling routine. In a step 310 the processor determines if GPDC mode is active. The GPDC mode may be inactive, e.g. if the purchaser of the ERV 105 has not purchased the GPDC option. If the GPDC mode is not active, the method 300 returns to the calling routine via an exit point 399.

In the event that the GPDC mode is active the method 300 advances to a decisional step 320. In the step 320 the processor 210 determines if the pressure differential reported by the transducer 190 is about equal to a desired set point, e.g. zero. In making this determination, the processor 210 may employ various control features such as a guard band or hysteresis to avoid over-controlling the ERV 105. If the pressure is about zero, the method 300 exits at the step 399.

In the event that the pressure is not about zero, the method 300 advances to a decisional step 330. If the reported pressure differential is greater than about zero, the method advances to a step 340. In the step 340 the processor outputs a signal to decrease the speed of blower 115.

The method 300 then advances to a step 350 in which the speed of the blower 120 is adjusted. For example, the exhaust blower 120 may be adjusted to maintain a ratio of intake to exhaust air so that the internal static pressure of the building being heated or cooled remains about constant. The method 300 then exits via the step 399.

In some cases it may be preferred that the speed of both of the blowers 115 and 120 is decreased about equally. In other cases, such as when a bypass damper is open in the ERV 105, the speed of the blowers 115, 120 may be decreased unequally, or one blower may be unaffected.

In the event that in the step 330 the pressure is not greater than about zero, the method advances to a step 360. In the step 360 the processor 210 outputs a signal to increase the speed of the blower 115.

The method 300 then advances to a step 370 in which the speed of the exhaust blower 120 is adjusted. As previously described, the speed of the blower 120 may be adjusted to maintain the static pressure of the building being heated or cooled. Also as before, the speed of one blower 15, 120 may be adjusted differently then the other blower or not at all. The method 300 then exits via the step 399.

Figure 4:
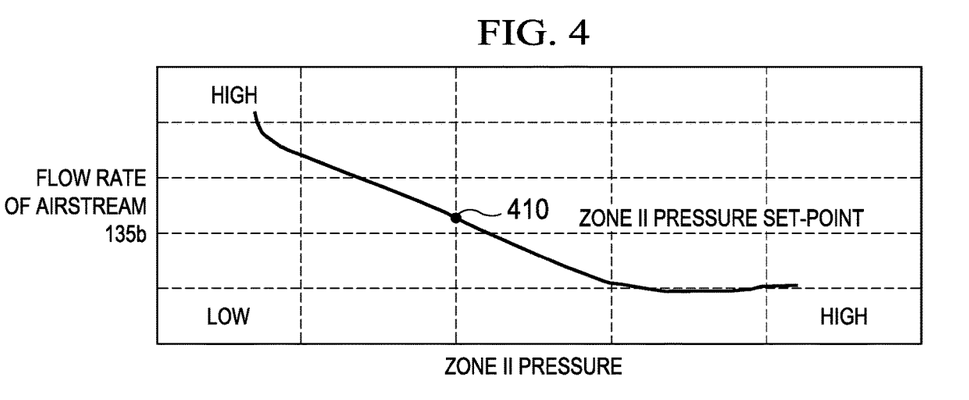
FIG. 4 illustrates pressure as a function of flow rate in one embodiment of an ERV configured to maintain an internal pressure set point, e.g. in zone II of the ERV of FIG. 1.

FIG. 4 illustrates a relationship, in one illustrative and nonlimiting embodiment, between the rate of outside air flow, e.g. the airstream 135*b*, and the pressure upstream of the economizer damper as measured by the pressure transducer 190 of the ERV 105. In this embodiment the pressure transducer 190 was located in zone II of the ERV 105 in a pull-pull configuration. The pressure characteristic includes a portion that decreases about linearly with increasing intake airflow. Thus within the linear region it is expected that a control algorithm configured to maintain a pressure set point within the ERV 105, e.g. the method 300, will be well-behaved. Some air quality regulations require that fresh air be controlled to within 15% tolerance of a desired set point during operation of the RTU 110. The linear characteristic of the illustrated relationship indicates that the required tolerance can be achieved with a system that is able to accurately measure pressure to 0.1 inch water column. Thus embodiments of the system 100 are expected to comply with such regulations using GPDC, e.g. without electrical communication between the ERV 105 and the RTU 110.

In some embodiments an operating setpoint 410 for the pressure measured by the transducer 190 may be set at about a mid-range of the linear portion of the flow rate characteristic of FIG. 4. While the system 100 may be operated such that the setpoint 410 is located at other than a midpoint of the flow rate characteristic, it is expected that various control algorithms may be more stable when the operating setpoint is configured as illustrated.

Figure 5:
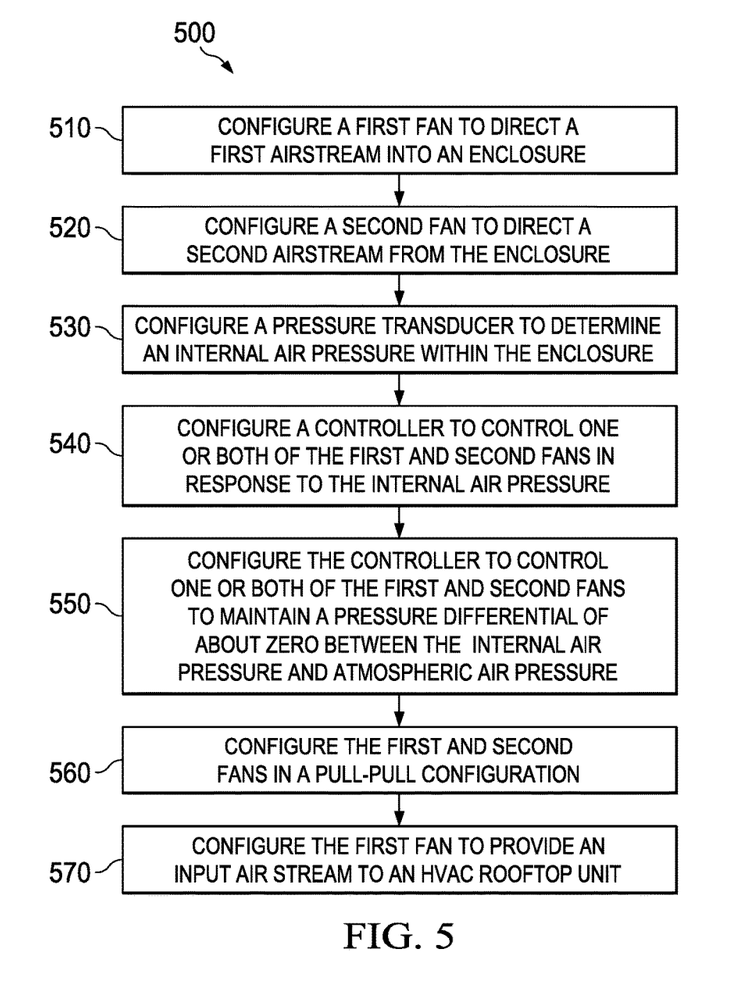
FIG. 5 is one embodiment of a method of manufacturing the HVAC system of FIG. 1.

Turning to FIG. 5, a method 500 is presented according to one embodiment of the disclosure, e.g. a method of manufacturing an HVAC system. The method 500 is described in some cases by reference to various features previously described herein, e.g. in FIGS. 1-3, without limitation thereto. Various embodiments of the disclosure may use some or all of the illustrated steps, and may include steps that are not illustrated. Furthermore, in some embodiments steps of the method 500 may be performed in an order other than the illustrated order.

In a step 510 a first fan, e.g. fan 115, is configured to direct a first airstream into an enclosure. In a step 520, a second fan, e.g. the fan 120, is configured to direct a second airstream from the enclosure. In a step 530 a pressure transducer, e.g. the transducer 190, is configured to determine an internal air pressure within the enclosure. In a step 540 a controller, e.g. the controller 195, is configured to control one or both of the first and second fans in response to the internal air pressure.

In a step 550 the controller is configured to control one or both of the first and second fans to maintain a pressure differential of about zero between an interior region of the enclosure and outside air pressure. In a step 560 the first and second fans are configured in a pull-pull configuration. In a step 570 the energy recovery ventilator is configured to provide an input air stream to a rooftop HVAC unit.

Those skilled in the art to which this application relates will appreciate that other and further additions, deletions, substitutions and modifications may be made to the described embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. An HVAC system, comprising:
  a rooftop unit and an energy recovery ventilator (ERV), the rooftop unit comprising an economizer and a supply blower operable to force an airstream into a building, the ERV coupled to the economizer, the ERV comprising:
    an ERV housing including a divider and an enthalpy wheel that divides said ERV housing into multiple zones, the multiple zones comprising a first zone and a second zone separated from a third zone and a fourth zone by the divider, wherein the first zone is operable to receive an intake airstream from outside the ERV housing and provide the intake airstream to the second zone via the enthalpy wheel, the second zone is operable to receive the intake airstream from the first zone via the enthalpy wheel and provide the intake airstream to the economizer, the third zone is operable to receive an exhaust airstream from the economizer and provide the exhaust airstream to the fourth zone via the enthalpy wheel, and the fourth zone is operable to receive the exhaust airstream from the third zone via the enthalpy wheel and provide the exhaust airstream outside the ERV housing;
    a first blower located within said ERV housing to force the intake airstream through said enthalpy wheel and into the rooftop unit;
    a second blower located within said ERV housing to force the exhaust airstream through said enthalpy wheel and out of said ERV housing; and
    a pressure transducer located within the second zone of said ERV housing and configured to determine an internal air pressure within said ERV housing, wherein the pressure transducer is operable to sense a decrease of the internal air pressure in the second zone of the ERV housing in response to the economizer increasing demand for the intake airstream, and to sense an increase of the internal pressure in the second zone of the ERV housing in response to the economizer decreasing demand for the intake airstream; and
    a controller coupled to said pressure transducer to receive an electrical signal therefrom and configured to control said first blower and/or said second blower in response to said internal air pressure to maintain a set point for said internal air pressure, thereby allowing the ERV to operate cooperatively with the economizer while remaining electrically independent;
    wherein said set point is set according to a mid-range of a linear portion of a flow rate characteristic, the linear portion of the flow rate characteristic comprising flow rates for which the internal air pressure in the second zone decreases about linearly with increasing the flow rate of the intake airstream to the economizer.

2. The HVAC system of claim 1, wherein the set point is based on an absolute pressure within the second zone.

3. The HVAC system of claim 1, wherein said controller is configured to increase a speed of said first blower and/or said second blower when said internal air pressure indicates that the economizer has increased demand for the intake airstream.

4. The HVAC system of claim 1, wherein said controller is configured to decrease a speed of said first blower and/or said second blower when said internal air pressure indicates that the economizer has decreased demand for the intake airstream.

5. The HVAC system of claim 1, wherein said first and second blowers are configured in a pull-pull configuration, such that they direct air flow through said ERV housing in opposite directions.

6. The HVAC system of claim 1, wherein the controller is further configured to employ control features when controlling the first blower and/or the second blower of the ERV to maintain the set point, the control features comprising a guard band or hysteresis configured to avoid over-controlling the ERV.

7. A method of manufacturing an HVAC system comprising:
fabricating a rooftop unit comprising an economizer and a supply blower operable to force an airstream into a building;
fabricating an ERV housing including a divider and an enthalpy wheel that divides said ERV housing into multiple zones the multiple zones comprising a first zone and a second zone separated from a third zone and a fourth zone by the divider;
locating a first blower in said ERV housing to force an intake airstream from the first zone through the enthalpy wheel and out of the second zone;
locating a second blower in said ERV housing to force an exhaust airstream from the third zone through the enthalpy wheel and out of the fourth zone;
locating a pressure transducer in the second zone of said ERV housing and configuring said pressure transducer to determine an internal air pressure within said ERV housing;
coupling the ERV housing to the economizer of the rooftop unit such that:
the first zone is operable to receive the intake airstream from outside the ERV housing and provide the intake airstream to the second zone via the enthalpy wheel;
the second zone is operable to receive the intake airstream from the first zone via the enthalpy wheel and provide the intake airstream to the economizer;
the third zone is operable to receive the exhaust airstream from the economizer and provide the exhaust airstream to the fourth zone via the enthalpy wheel;
the fourth zone is operable to receive the exhaust airstream from the third zone via the enthalpy wheel and provide the exhaust airstream outside the ERV housing; and
the pressure transducer is operable to sense a decrease of the internal air pressure in the second zone of the ERV housing in response to the economizer increasing demand for the intake airstream, and to sense an increase of the internal pressure in the second zone of the ERV housing in response to the economizer decreasing demand for the intake airstream; and
coupling a controller to said pressure transducer to receive an electrical signal therefrom, said controller being configured to control one or both of said first and second blowers in response to said internal air pressure to maintain a set point for said internal air pressure, thereby allowing the ERV to operate cooperatively with the economizer while remaining electrically independent;
wherein said set point is set according to a mid-range of a linear portion of a flow rate characteristic, the linear portion of the flow rate characteristic comprising flow rates for which the internal air pressure in the second zone decreases about linearly with increasing the flow rate of the intake airstream to the economizer.

8. The method as recited in claim 7, wherein the set point is based on an absolute pressure within the second zone.

9. The method as recited in claim 7, wherein said controller is configured to increase a speed of said first blower when said internal air pressure indicates that the economizer has increased demand for the intake airstream.

10. The method as recited in claim 7, wherein said controller is configured to decrease a speed of said first blower when said internal air pressure indicates that the economizer has decreased demand for the intake airstream.

11. The method as recited in claim 7, wherein said second zone comprises a bypass damper, and wherein said controller is configured to:
adjust a speed of said first blower and a speed of said second blower equally when the bypass damper is closed; and
adjust the speed of said first blower and the speed of said second blower unequally when the bypass damper is open.

12. The method as recited in claim 7, further comprising configuring said first and second blowers in a pull-pull configuration, such that they direct air flow through said ERV housing in opposite directions.

13. The method of claim 7, wherein the controller is further configured to employ control features when controlling the first blower and/or the second blower of the ERV to maintain the set point, the control features comprising a guard band or hysteresis configured to avoid over-controlling the ERV.

* * * * *